United States Patent [19]
Glansk et al.

[11] Patent Number: 5,566,711
[45] Date of Patent: Oct. 22, 1996

[54] COMBINED CONTROL AND REGULATING VALVE FOR LIQUIDS OR GASES

[75] Inventors: Leif Glansk, Fristad; Leif Marstorp, Ljung, both of Sweden

[73] Assignee: Tour & Andersson AB, Johanneshov, Sweden

[21] Appl. No.: 512,677

[22] Filed: Aug. 8, 1995

Related U.S. Application Data

[62] Division of Ser. No. 294,608, Aug. 23, 1994, abandoned, which is a continuation of Ser. No. 984,428, Jul. 10, 1991, abandoned.

[30] Foreign Application Priority Data

Aug. 28, 1990 [SE] Sweden ................................ 9002744
Mar. 12, 1991 [SE] Sweden ................................ 9100735

[51] Int. Cl.[6] ................................................ F16K 51/00
[52] U.S. Cl. ........................................ 137/557; 137/560
[58] Field of Search .................................. 251/145, 216; 137/317, 557, 560

[56] References Cited

FOREIGN PATENT DOCUMENTS

| | | |
|---|---|---|
| 0153427 | 9/1985 | European Pat. Off. . |
| 0221464 | 5/1987 | European Pat. Off. . |
| 465636 | 10/1991 | Sweden . |
| 1110157 | 4/1968 | United Kingdom . |

*Primary Examiner*—John Fox
*Attorney, Agent, or Firm*—Davis and Bujold

[57] ABSTRACT

A combined control and regulating valve (1) having a housing (2) with an inlet (3) and an outlet (4) as well as a partition (5) between said inlet and outlet and having a seat (6) designed for an interaction with a main valve body (7), which is adjustable from outside. To said inlet and said outlet are connected a measuring nipple each (50 and 74, respectively) via a bore (30, 31 and 40, 41 respectively) for the measurement and the control of temperature and/or pressure. One of the measuring nipples is designed as a multiple function nipple (50) having a cut-off-valve permitting tapping and filling of the medium, which is to be controlled/regulated. In order to enhance reliability in operation, to provide even more precise and reliable measuring results, to reduce the risk of clogging of the cavities leading to the measuring nipples, to reduce costs for manufacturing and/or fitting, to provide preconditions for various conditions of operation and for partial changes as well as for being able to affect other valve properties, like sealing properties and use of differently designed or dimensioned valve bodies, at least one bore (30, 31) is extended axially to communicate with a so extended portion (110) with a zone of the medium channel (73) downstream of said seat (6) via an area immediately above said valve body (7) or around said seat (6) by means of a casing provided with a groove.

11 Claims, 7 Drawing Sheets

COMBINED CONTROL AND REGULATING VALVE FOR LIQUIDS OR GASES

This is a divisional of application Ser. No. 08/294,608 filed on Aug. 23, 1994, which is a continuation of 07/984,428 filed on July 10, 1991, now abandoned.

The present invention relates to a combined control and regulating valve for liquids or gases according to the preamble of claim 1.

Such valves are used e.g. in heating and cooling systems as well as in tap water systems and they are designed to regulate and cut off, respectively, a liquid flow, allow measurement of the pressure difference, allow discharge and/or filling of liquid and/or temperature measurement. This valve suitably is designed to allow presetting of the liquid flow, e.g. by means of the wheel, which is manually controlled or driven by a motor.

The valves used so far for these purposes are often very complicated and expensive to produce, assemble and mount as well as to handle. Also, the various functions are usually not present in one existing valve construction but are distributed in a non-advantageous way, which makes at least some part or parts of the valve difficult of access, since such valves often are mounted in positions which are difficult of access. Also, there may be an increased risk of leakage and above all it is difficult or impossible to optimize the known valves as to various combinations of purposes and differently conceived plants, i.e. it is difficult to adjust the known valves to varying needs in a quick and simple way.

Such previously known valves are exemplified in EP-A2-0221464, in which alternative functions are mentioned as such but without any specific illustration or description. The path for measuring signals is complex and calls thus for special, cost increasing working operations at the same time as there is a certain risk of clogging and tendency to changes in measuring results. EP-A1-0153427 is a typical example of separately provided measuring and tapping/refilling connectors (FIG.1). Despite common base or connector for these function, this is the case as well with GB-A-1 110 157, in which a connector branch houses a shut-off or throttling valve, while a different connector branch may be connected to arbitrary apparatus.

The main purpose of the present invention is to counteract and as far as is feasible eliminate the abovementioned drawbacks and to develop an improved combined control and regulating valve, which above all is distinguished by an excellent flexibility and combination and adjustment possibilities respectively as well as by a simplified handling, particularly a more focused one, the risk of incorrect results and faulty applications being decreased or eliminated entirely. Other purposes of the invention is to generally develop the state of the art in this field and to suggest a generally advantageous valve having a long service life and reliable functions.

The prime object of the present invention is to increase the safety of operation, to render the measuring results more precise and reliable, to reduce the risk of a clogging of the cavities, which lead to the measuring nipples, to reduce the production and/or assembly costs, to obtain what is required for different operation conditions and for partial changes, as well as to be able to indirectly influence additional valve properties, e.g. sealing porperties, and the use of differently designed and dimensioned respectively valve bodies.

These purposes are obtained by designing a valve of the type described in the introduction mainly in the way set forth in the characterizing clause of claim 1.

Additional characterizing features and advantages of the present invention are set forth in the following description, reference being made to the accompanying drawings, which show some preferred but not limiting embodiments of the invention:

FIG. 1 shows a previously designed control and regulating valve in an axial diametrical section;

FIG. 2 also is an axial diametrical section of a differently designed embodiment of a portion of the valve shown in FIG. 1; FIGS. 3, 4 and 5, respectively, show in diametrical sections various examples of connections from a measuring portion to a medium channel or the like in line with special embodiments according to the invention;

Figure 1:
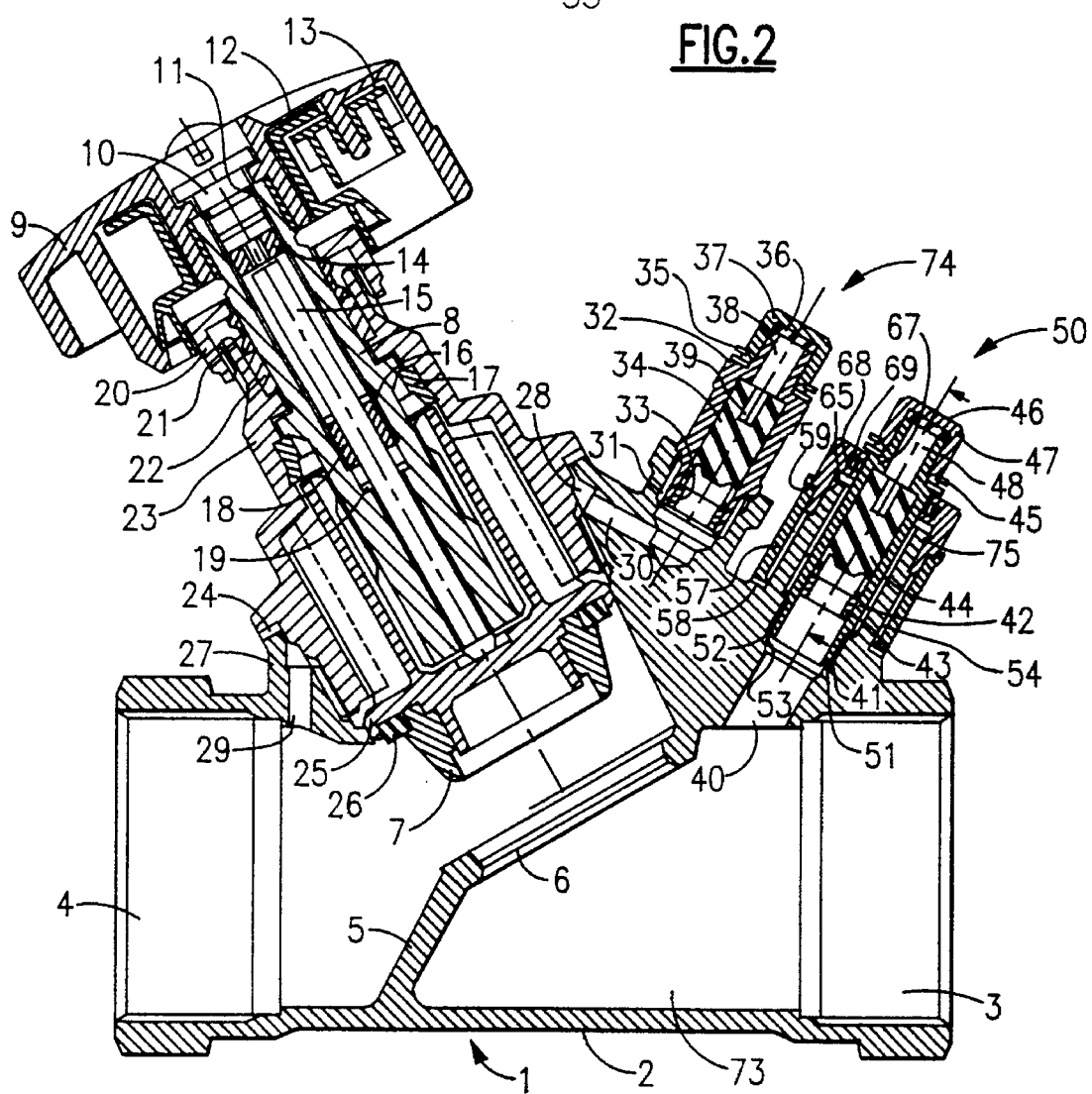

The valve shown in FIG. 1 is in its entirety designated 1. It comprises a housing 2 having a medium passage or the like 73 with an inlet 3 and an outlet 4 which, of course, may have reversed functions. A partition 5 between said inlet and outlet is provided with a main seat 6, with which a main valve body 7 cooperates, which is attached to the interior end of e.g. an outer spindle 8, on the exterior end of which e.g. an adjusting wheel 9 is disposed having a wheel screw 10, an O-ring 11, an indicating ring 12, a digit wheel 13, a pre-setting screw 14, an inner spindle 15, a threaded casing 16, a lock ring 17, a stuffing box packing 18, a plate 19, a packing box nut 20, a gland 21, a stuffing box packing 22, a top piece 23, a packing 24, a cone 25, a seal ring 26, and a connecting joint 27 for said top piece. This portion of the valve mainly is in accordance with the device described in SE-A-448 651 and consequently it will not now be described in further detail. Of course, another type of adjusting means, e.g. an electric motor (not shown), can also be used.

Connecting joint 27 is provided with a ring channel 28, which is inwardly open and communicates with outlet 4 via a channel 29 and which is connected to a bore 30, which in its turn is connected to a threaded hole 31, which ends freely at the exterior side of housing 2, suitably between inlet 3 and joint 27, and which is closed at its end in the housing. A nipple 74 with a measuring portion 32 is threaded into this hole and provided with an adjusting ring 33, a sealing body 34, a holding element 35, a seal 36, a cover 37, a nipple neck opening 38 and an insertion opening 39, which two openings are designed for an insertion of a measuring probe designed to measure pressure and/or temperature.

Inlet 3 communicates via a passage 40 with a multiple function nipple 50, which comprises a measuring portion 42, which suitably roughly is in accordance with the way parts 31–39 are designed as shown. Consequently, in this part of the drawing 41–49 designate parts, which correspond to parts 31–39. However, interior end 51 of measuring portion 42 is in this case provided with a bevel 52, preferably on all sides, having a valve body function designed for a sealing or closing cooperation with a seat 53, which suitably comprises a sharp step in passage 40, more precisely at the transition of the passage from an interior smooth part to an exterior threaded part 54, into which measuring nipple 42 is secured. An interaction between a sharp edge and a beveled surface results in a satisfactory sealing effect, also if no type of special sealing or packing is used, particularly in case the sharp edge is deformed somewhat and in this way possible minor irregularities easily and simply are removed.

Figure 2:
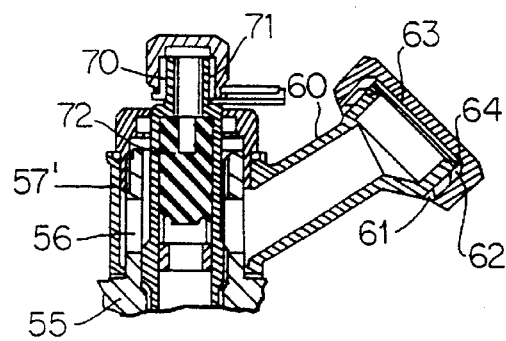

The cut-off function of measuring portion 42 is due to the fact that said exterior threaded part 54 of passage 40 at least partly is placed in a neck 55, which projects from housing 2, suitably in the same plane as joint 27 and parts 31–39 and which is provided with outlet openings 56 (see FIG. 2), which consequently extend through a portion of said thread. When portion 42 has been screwn outwards to such an extent, that its exterior thread has passed at least some of openings 56, liquid can flow between inlet 3 and the area outside neck 55, which normally is closed, either by means of a completely closed casing 57 having end packings 58 and 59 or by means of a casing 57 having a connection 60 (FIG. 2). In case a casing 57 which is closed on all sides is used (FIG. 1), the discharge and the filling function respectively of the multiple function nipple are dispensed with. In the example shown in FIG. 2 connection 60 of rotatably disposed casing 57 is at its free end provided with an exterior thread 61, on which is screwed a cover 64, provided with an interior thread 62 and a packing 63, which cover consequently can be removed in order to connect a discharge or filling hose (not shown). In the two cases the exterior end of the casing is sealed by means of a nut 66, provided with an inner thread 65 and threaded onto thread 75 of neck 55, packing 59 like packing 58 being compressed in order to obtain a complete sealing of the exterior part of the neck outwards. Nut 66 is provided with a central access opening 67, into which an O-ring 69 is inserted in a groove 68 for a sealing interaction with the outer thread-free end of the measuring portion., which end is mounted with a slip fit in said access opening. However, the outer thread of the nipple must not be able to pass through this opening. The nipple can be screwed inwards and outwards respectively, because its opening 38 is non-circular, e.g. a hexagon hole, which consequently can receive a hexagon spanner (not shown). In this way it is not necessary to remove the nipple, when e.g. liquid is to be filled or discharged, and parts 60–63 can be connected to a hose or the like, before the flow is opened up by screwing out the nipple. The outer end of the nipple, provided with an outer thread 70, is normally sealed by means of lock 37, provided with an inner thread 71, which lock is removed temporarily, when e.g. a probe (not shown) designed to measure the temperature and/or the pressure is to be inserted through holes 38,48 and 39,49 and through sealing body 34,44, preferably provided with a slit or the like 72, in order to reach inlet 3 and outlet 4 respectively. In order to retain the cover it can by means of a hinge-like holding element 35 made of a plastic material be retained on the outer nipple end. Cover 37 does not need to provide any primary sealing function. Sealing body 34 is primarily designed to seal outwards. In case it would leak, the cover will of course, have a sealing function.

Thanks to the described and shown characterizing features of the invention it is partly possible to substitute a casing having a joint 60 for a completely closed casing without discharging the fluid from the system, which consequently can remain in operation without any limitations. Also, it is not necessary to close or open any other valves; it is only necessary to check that measuring portion 42 is in its cut-off position, shown in FIG. 1, in which nut 66 and cover 37 can be removed without eliminating the sealing function. And partly in spite of these advantages it is not necessary to open up or close any valve in order to have access to the function of the nipple as a control and measuring element respectively. Casing 57 with joint 60 can steplessly be rotated to the desired connection position within a range of action of at least about 300°. of course, the multiple function nipple, designed as shown and connected to the inlet, may instead be connected to the outlet or such nipples may be connected to the inlet as well as the outlet. Bore 30 can in a special case communicate with passage 40, possibly via a special cut-off valve (not shown). In such a case only one multiple function nipple may be sufficient and suitably no simple measuring nipple is to be used at all. In this case it is possible to use cut-off valves at inlet 3 as well as at outlet 4, and in this way it is possible to measure the pressure and/or temperature conditions on either side of seat 6 or on both sides simultaneously.

Figure 3:
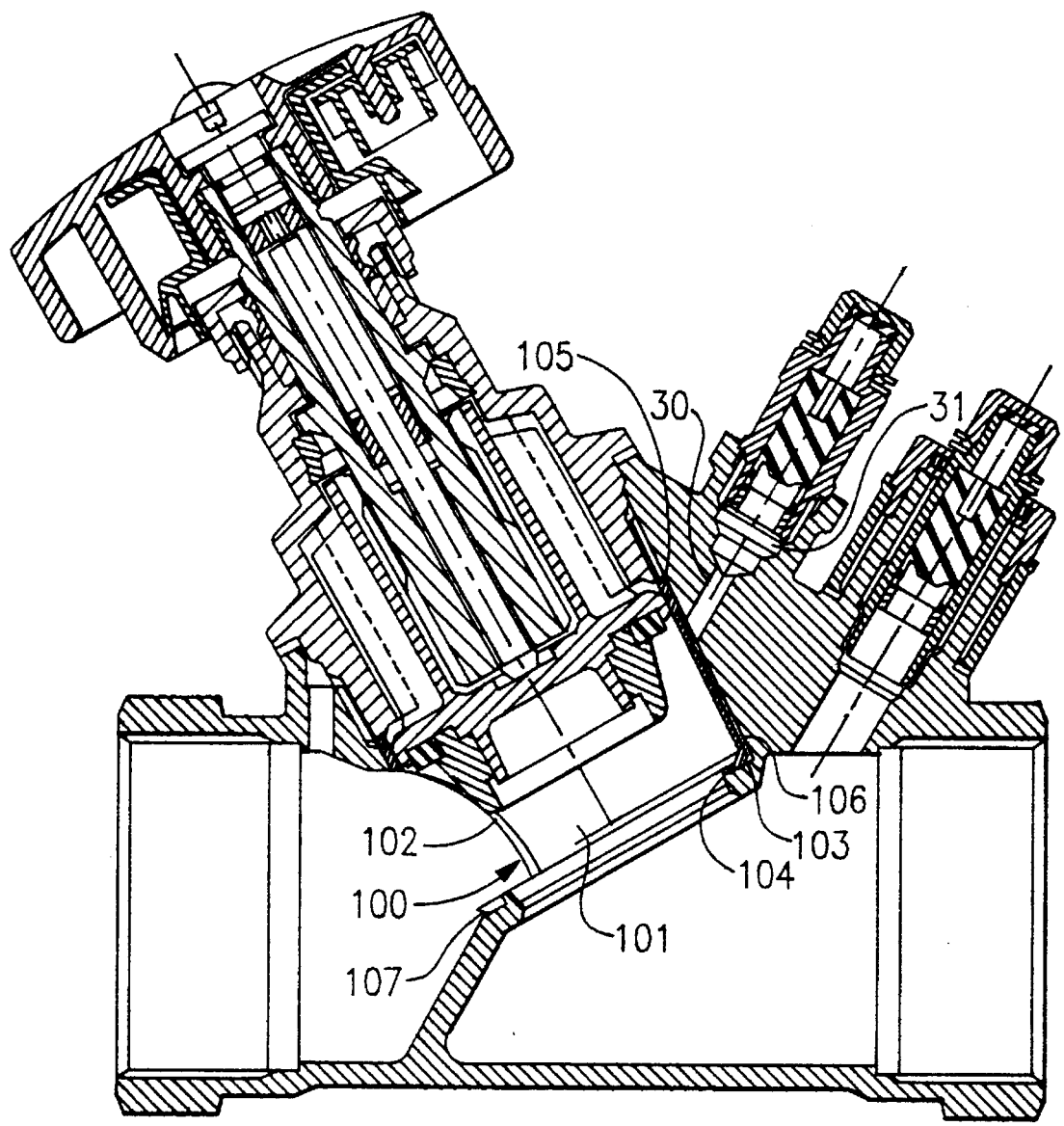

In the embodiment according to FIG. 3 the valve housing is covered, in connection with seat 6 in the direction of the valve body attachment, with a casing 100, the wall 101 of which ends in circumferential direction at the valve housing wall, an outlet opening 102 open towards outlet 4 being formed. Said casing is inserted into a groove 103 outside seat 6 in concentric relation to the latter, an inwardly collared flange 104, with that side which is turned towards the valve body, being positioned in the same plane as the surface of seat 6, which is turned towards said body. The other end of said casing possibly has an inner bevel 105 in order to facilitate the tightening of the top piece of the valve in a threaded bore 118 in joint 27.

In this case, bore or the like 30 is designed as a central and axial continuation of hole or the like 31 and ends in a groove 106 in either the valve housing material or in the outside of said casing, which groove extends along the main axial length of the casing and into a position below the shoulder of the flange 104 and around the flange on all sides to terminate in an opening 107 on the diametrically opposite side of said seat in relation to said nipples. Through this opening a pressure signal can be received into e.g. one of the nipples.

Said casing can be stationarily fastened in said valve housing in a way known per se, and in this way opening 102 can not unintentionally change its position. The casing can be made of a metal and/or a plastic material. It can also, if this is desired, form a part of the seat or even the entire seat. The opening is preferably comparatively compact and not slot-like.

Figure 4:
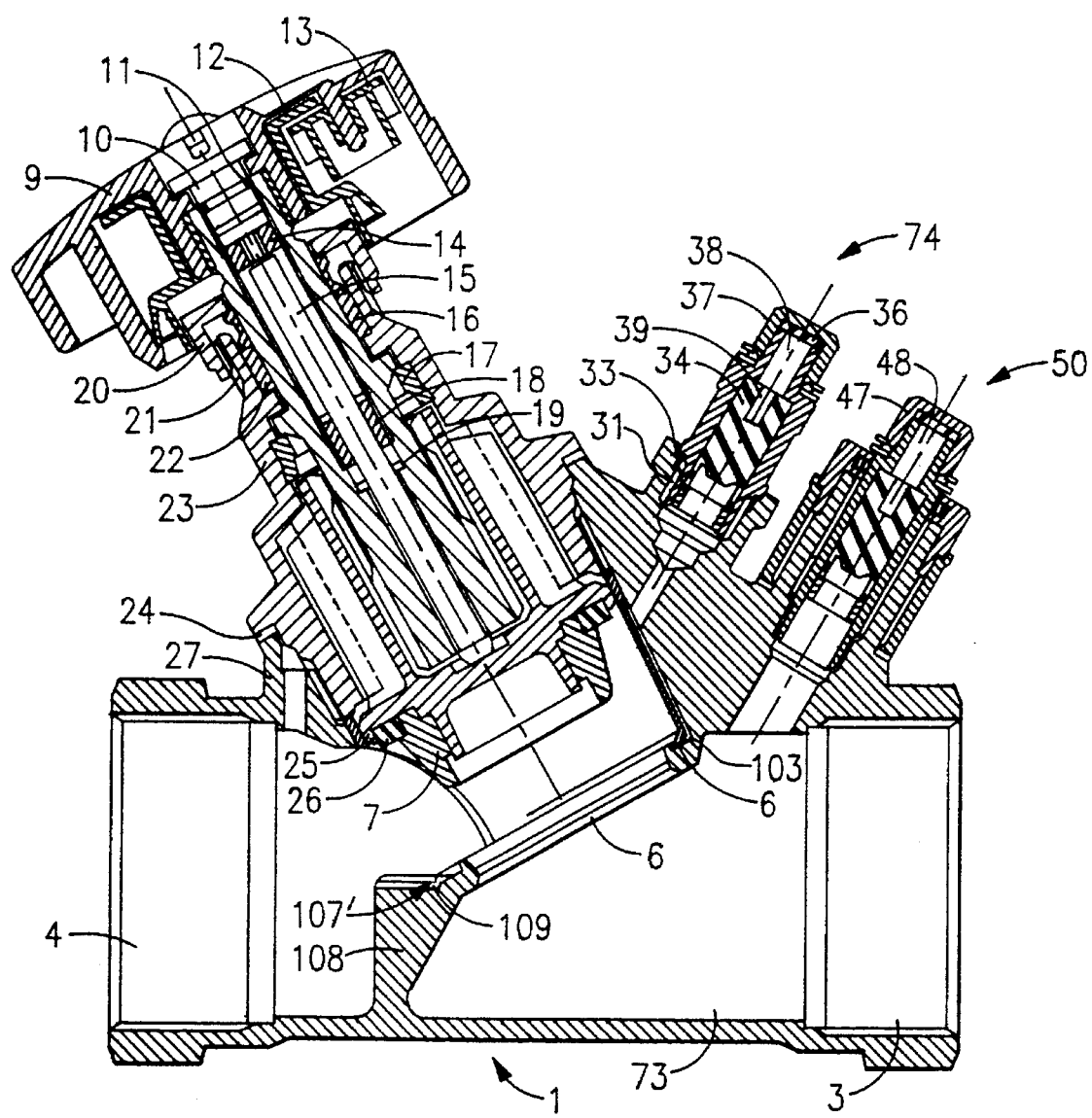

As an alternative embodiment, opening. 107' can according to FIG. 4 be placed in a thick part 108 of seat 6 and be formed of the outer end of a channel 109, which is drilled through this thick part, which channel with its inner end is connected to groove 103.

In accordance with an embodiment not, shown such a thick part, the purpose of which is e.g. to remove said opening away from the area around the seat, can be designed as a continuation of opening. 102 or of the casing material beyond seat 6 in relation to the nipples, which casing material can bear against central wall 5.

Figure 5:
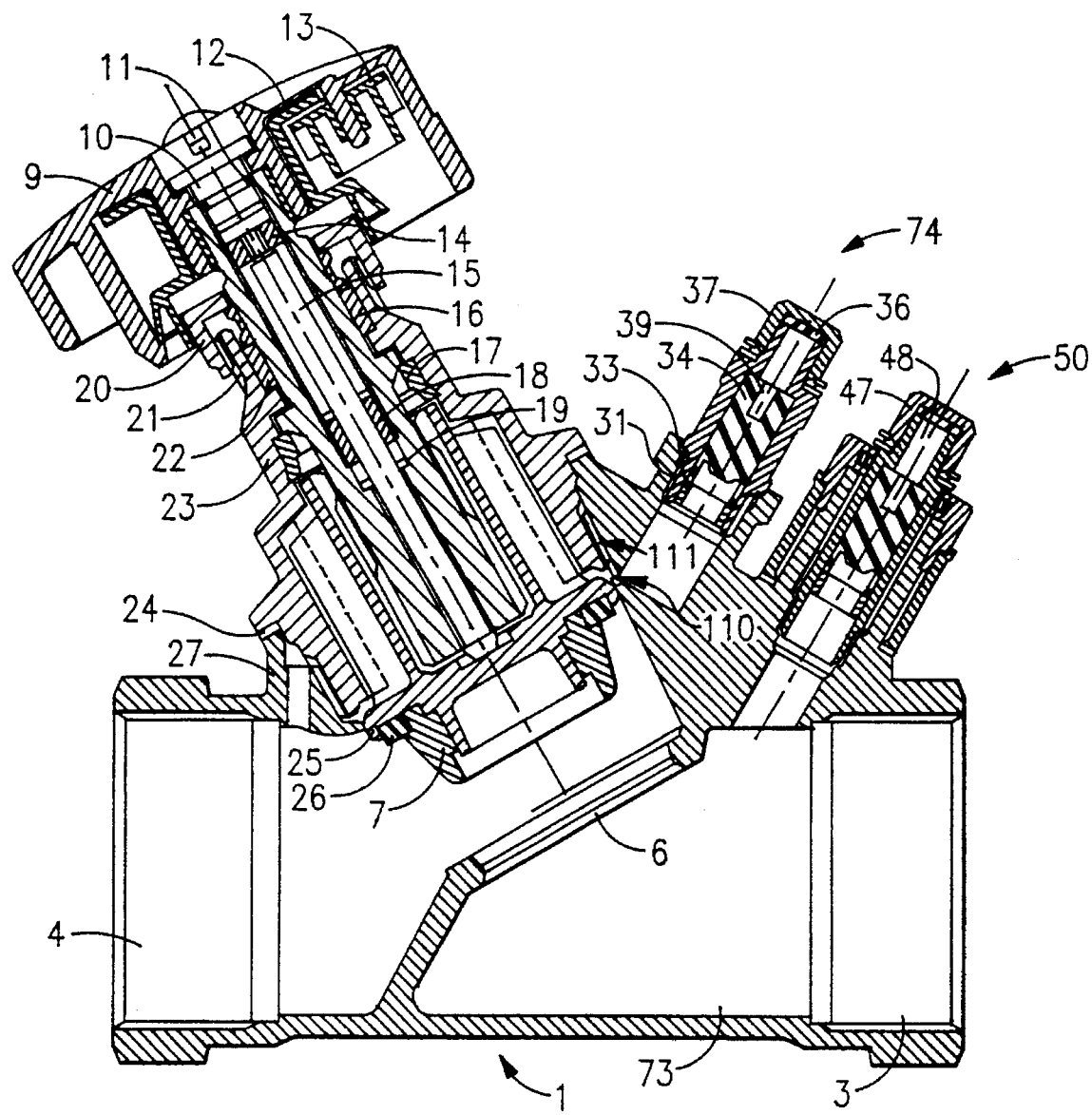

The embodiment shown in FIG. 5 is particularly advantageous as far as the manufacturing goes, since the drilling of a special bore 30 i avoided, which is replaced by an extension of hole 31, which in the bottom area contacts the threaded bore 118, into which the top piece of the valve is screwed, namely right against the end or the inner step of this hole, an opening 110 being formed, the free access of which to the area between the top piece of the valve and the valve cone suitably is guaranteed by means of a recess 111, which can be done in the form of an axial channel 111, which simply can extend along and through all the threading in the bore 118, which as to the manufacturing is particularly simple. That part of the channel, which is covered by the top piece of the valve, of course does not serve any purpose. Merely the free part between the top piece of the valve and the valve cone in and immediately adjacent opening 110 are within this area used to remove the unnecessary and disturbing threading and guarantee that a pressure signal can be received without disturbances.

Figure 8:
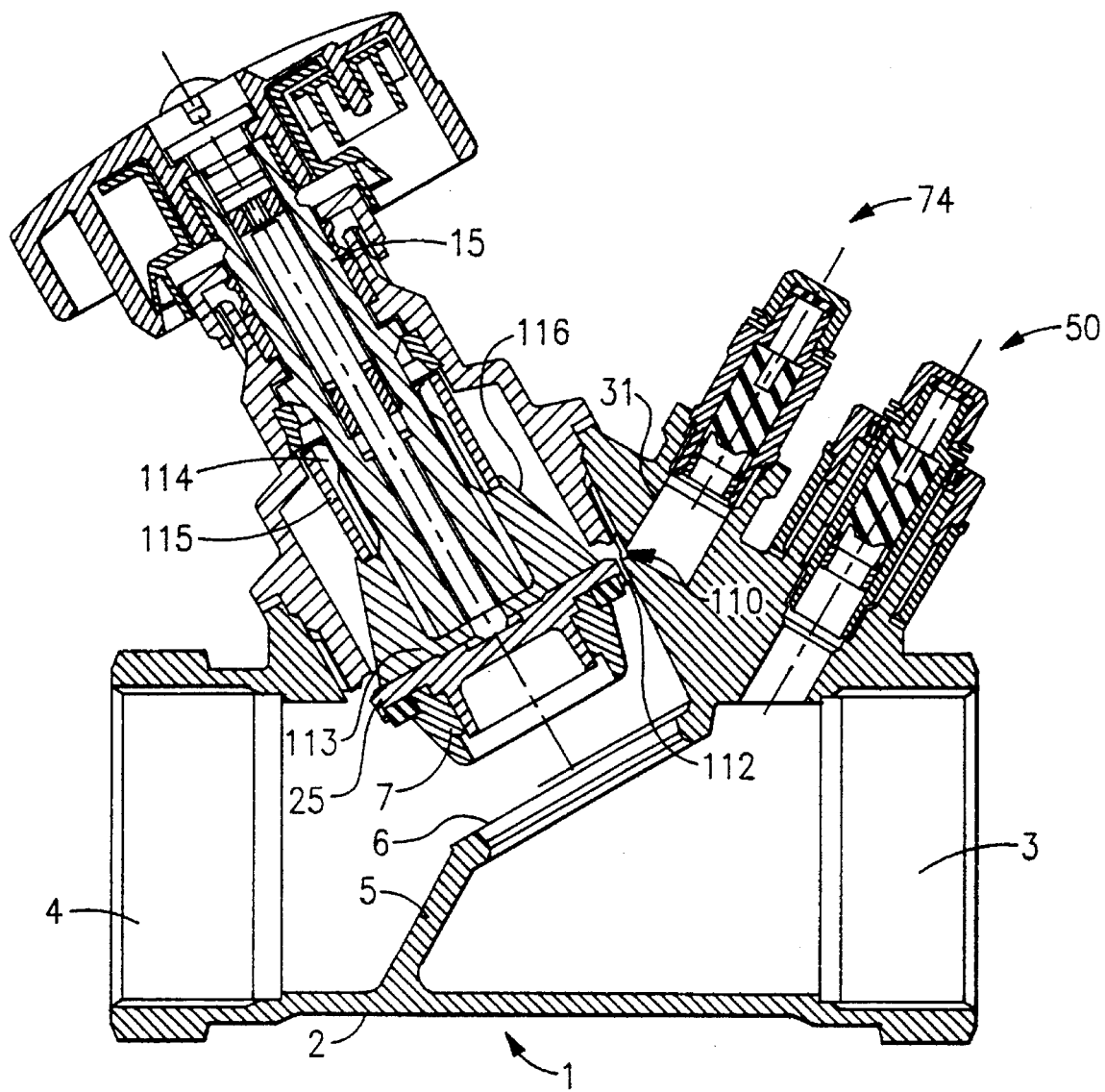
FIG. 8 is a longitudinal diametrical section of a further valve according to the invention.
Figure 9:
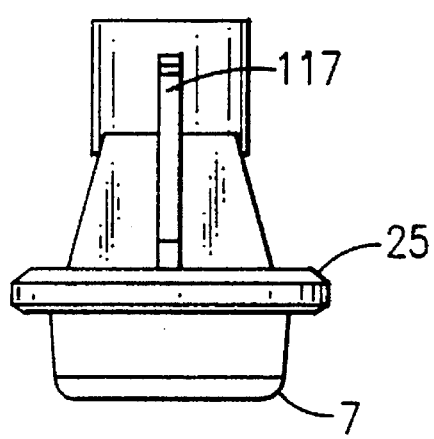
FIG. 9 is a side elevational view of a valve body according to FIG 1.
Figure 10:
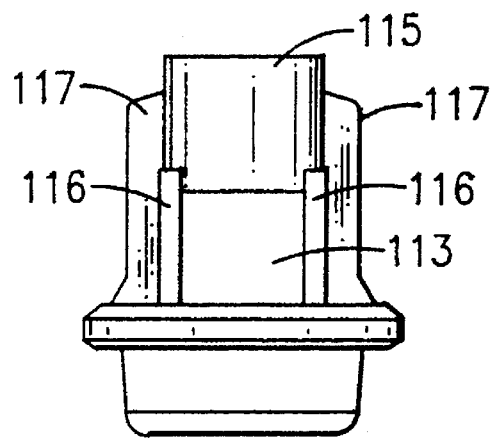
FIG. 10 shows the valve body according to FIG. 2 seen from left or right in FIG. 2.
Figure 11:
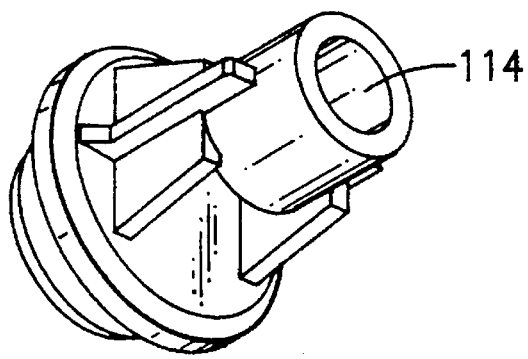
FIG. 11 shows the valve body according to FIG. 3 in a perspective view from above.
Figure 12:
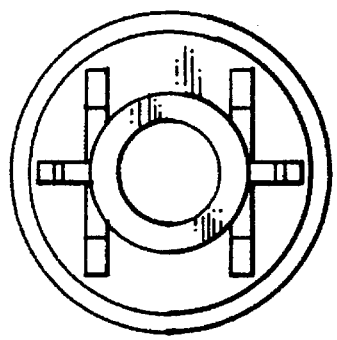
FIG. 12 shows the valve body according to FIG. 2 in a top plan view.

The measuring nipple 74 shown in FIG. 8 is inserted into a bore 31, one edge area of which communicates with outlet 4 via an opening 110, which is produced either by extending bore 31 so far into the valve casing, that said opening is produced, and/or by inserting e.g. a cutting tool from outlet 4 or the connector, into which the valve top is fitted, preferably in a somewhat oblique position, so that a recess i formed, the shape of which is characterized in that the recess does not open towards the valve seat but towards e.g. the valve spindle. In this way, non-advantageous turbulences are avoided, which may adversely affect the measuring result or lead to other irregularities.

According to a further feauture of the invention, there is a gap 112 between flange 25 of valve cone 7 and the surrounding valve casing wall, which gap is very narrow, e.g. between 0.1 and 3.0 mm, preferably app. 0.5 mm according to a preferred embodiment, the purpose of which gap is to allow equalization or propagation of the pressure of the flowing medium on both sides, i.e. above and under the cone, but which gap is to prevent substantial currents in general and currents in particular, which are directed towards opening 110o It will be appreciated, that the embodiment shown in FIG. 8 does not permit anything else than a weak flow or a quiet and uniform pressure propagation within a point-like area bypassing opening 110. The latter can accordingly never be affected by a direct current, but only by an indirect current or flow, which brings about uniform measuring results, which are very close to the virtual pressure differences between inlet and outlet side of the valve or apparatus. Said gap and its described effect neutralize even a suction or jet effect, which may occur particularly in connection with stronger flows, within the area of the cavity, which is provided between cone and casing on that side, which is diametrically opposite in relation to opening 110. Even the lack of underpressure achieved in this way brings about more real and uniform measuring results.

According to a further characterizing feauture of the invention, valve spindle 15 and/or cone 7 are designed with a transversely throughgoing opening 113, which is formed by a flange-like top part of cone 7 on the one side and by a casing-like holder 115, which e.g. is provided with an inner thread 114, which holder extends in axial direction of the spindle on the other side. The holder is fastened between lateral parts 116, which project in mutually parallel relation from flange 25 and delimit said opening 113 between themselves. Centrally on the outside of side parts, there are guiding ribs 117 extending axially, which ribs prevent the cone from turning when moved axially. A flow of medium around and between parts 115–117 may also occur, as there is no night fitting in relation to the valve casing. As is obvious, the spindle is composed of several parts and an outer end or an inner spindle may extend forward to flange 25 with e.g. partial filling of opening 117. The latter must, however, always be maintained to at least some extent, so that medium may flow more or less diametrically through the spindle or cone, to which belong even the parts arranged on flange 25. In this way, quiet and direct pressure propagations between outlet and measuring nipple 74 are acheived simultaneously.

As to the gap, its stabilizing properties with respect to turbulences must particularly be stressed, which is due to its small dimensions in radial direction in combination with its nevertheless relatively large area thanks to its circumferential extension, due to which flow between the areas in front of and behind the cone is thoroughly dispersed and equalized. Even the shape of the opening between the cone and the valve casing on the diametrically opposite side in relation to the opening 110 has a certain importance. This opening becomes crescent-like and its size is dependent from the cone position. A minor suction or jet effect, which may occur, is counteracted as mentioned before by the gap and is least noticeable in the vicinity of opening 110, which is a clear advantage.

In a practical example, the valve according to the invention may have a size according to the drawings. A gap whidth of 0.4 mm and circumferential extension of 270 renders a radial area of app. 40 mm, thus a considerable area. the opening between cone and the adjacent casing wall, which is located diametrically opposite opening 110 may be extinguished when valve is fully open and amount to app. 350 mm$^2$ when valve is entirely shut off. One may, of course, choose such a cone and spindle and spindle movement limitation, respectively, that a certain opening always may be left. Opening 110 may have an area of app. 50 mm$^2$. One could say that said gap area amounts to at least 20 and at the most 400 preferably app. 80% of the smallest area of opening 110.

Figure 7:
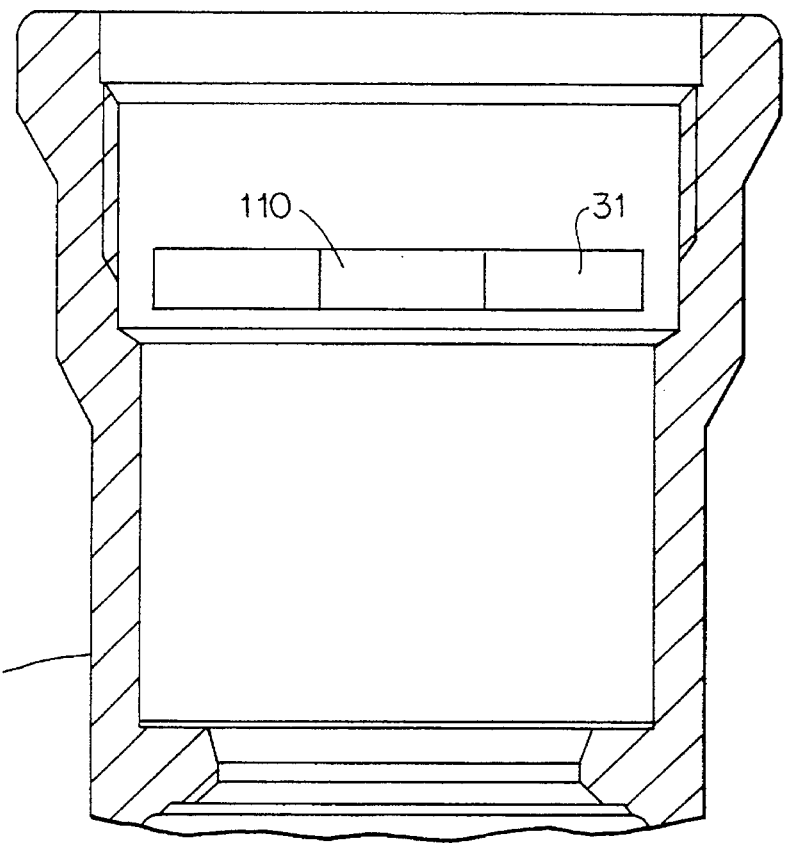
FIG. 7 is a sectional view according to line 7—7 in FIG. 6.
Figure 6:
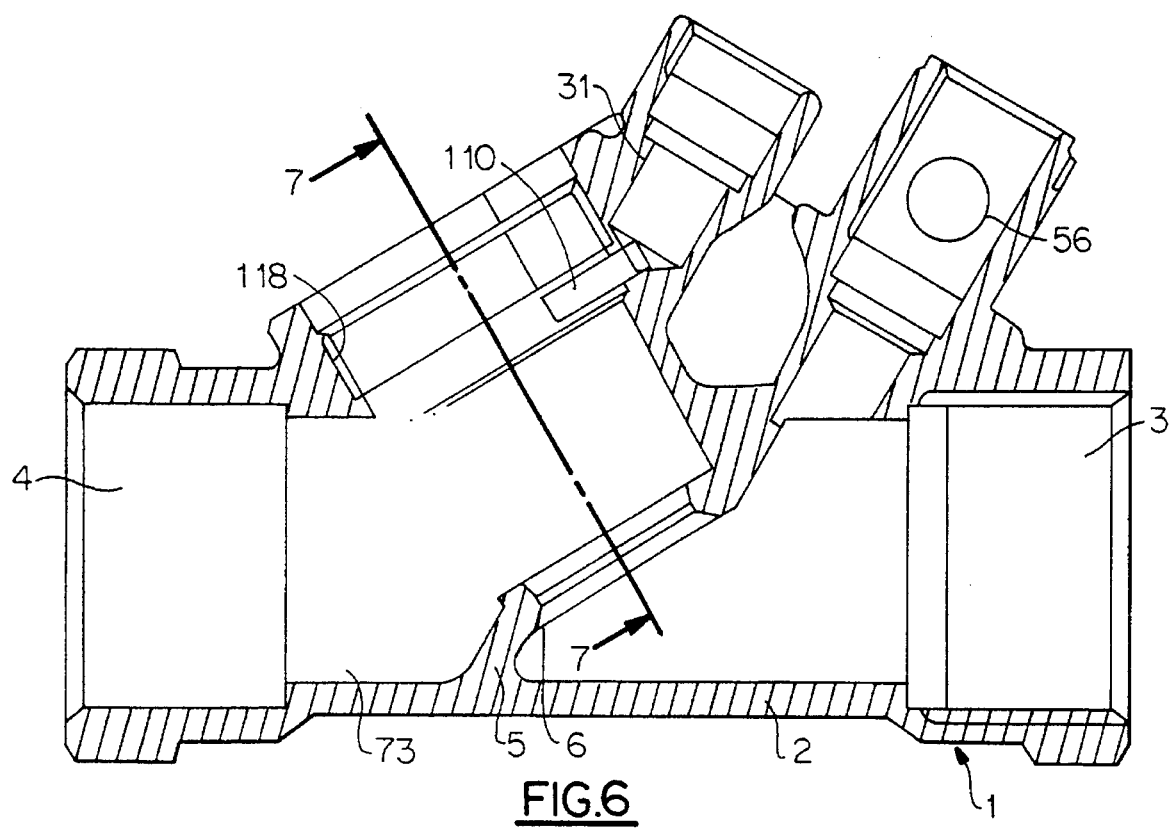
FIG. 6 shows a preferred embodiment of a valve housing according to the invention in an axial diametrical section.

In FIGS. 6 and 7 is shown a modified embodiment of a valve housing, which is very suitable for a combination with the other valve parts as shown and described, particularly in FIG. 8. As is appearant, the nose angle of a drill used to produce bore 31 is chosen and is bore 31 positioned such, that the one bottom flank runs in mainly parallel relation to threaded bore 118, into which the valve. top is inserted. Hereby, the bore bottom does not establish direct contact with channel 73, which instead is acheived via opening 110, which has a cut-out appearance extended radially outwardly through bore 118. The cut-out portion may extend along 30°–150°, preferably app. 90° of the circumference of bore 118 and may centrally be 0.5–10.0, preferably app. 3 mm deep in the valve housing material. This is a very simple, efficient and suitable mode to produce a measuring channel connection between a measuring nipple and that area, from which a measuring signal is to be picked up. This area attains in this way an advantageous delta-like shape, which guarantees as well quite as precise measuring impulse propagation at the same time as the risk of clogging is minimal. Even with respect to casting technique, this valve housing embodiment has obvious advantages, as there are no hidden cavities and all subsequent working operations may be executed in a fast and precise manner. Any rejection rate will therefore be negligable.

We claim:

1. A valve for measuring and controlling at least one of temperature and pressure in a fluid medium channel comprising:

a valve housing (2) defining said fluid medium channel therein and having a partition wall (5) dividing said fluid medium channel into an inlet (3) and an outlet (4);

a valve bore (118) in said housing having a valve spindle (8, 15) extending therethrough in sealed engagement therewith, a valve body (7, 25) attached to an inner end of said spindle (8, 15), an outer diameter of said valve body (7, 25) being slightly smaller than an inner diameter of said valve bore (118), thereby defining an annular narrow gap (112) between an inner peripheral surface of said valve bore and an outer peripheral surface of said valve body;

a valve opening passing through said partition wall (5) connecting said inlet to said outlet and having an edge located in said partition wall (5) defining a valve seat (6) for cooperation with said valve body (7, 25);

a first passage (31) extending into said housing and having a first passage extension (30) extending said first passage (31) into communication with said outlet (4) on a side of said valve body (7, 25) remote from said valve seat (6); and a first measuring nipple (74) sealingly received in said first passage (31), for insertion of a measuring probe, through said first measuring nipple and into said first passage for measuring at least one of temperature and pressure at a location in said first passage (31), said first passage (31) being in communication with said outlet (4) via said first passage extension (30) and said narrow gap (112);

wherein said valve body (7, 25) and said valve bore (118) are sized to provide said narrow gap (112) with a gap width sufficient to permit equalization of pressure of the fluid medium on both sides of said gap, yet narrow enough to prevent turbulence created in the region of said valve seat (6) from passing through said narrow gap into said first passage (31), to ensure accurate measuring results.

2. The valve according to claim 1, comprising a second passage (41) extending into said housing and having a second passage extension (40) communicating said second passage with said inlet (3);

a second measuring nipple (50) sealingly received in said second passage (41), for insertion of a measuring probe, through said second measuring nipple (50) and into said second passage (41) for measuring at least one of temperature and pressure at a location in said second passage.

3. The valve according to claim 2, wherein at least one of said first measuring nipple (74) and said second measuring nipple (50) is a multi-function measuring and discharge/fill nipple with a hose coupling for selectively discharging fluid medium from and filling fluid medium into said fluid medium channel.

4. The valve according to claim 1, wherein said first passage extension (30) is a straight axial continuation (31) of said first passage and an inner corner of said axial continuation (31) communicates with said outlet (4) via a corner opening (110) that communicates with a recess (111) in an inner peripheral surface of said valve bore (118), said recess is in communication with said outlet (4) via said narrow gap (112).

5. The valve according to claim 4, wherein at least one of said valve body (7) and said spindle (15) has a transverse opening (113) passing diametrically therethrough communicating said recess (111) with said outlet (4), whereby said recess (111) is in communication with said outlet (4) via said transverse opening (113) and said narrow gap (112).

6. The valve according to claim 4, wherein said recess (111) is defined by an axially extending groove (111) in an inner peripheral surface of said valve bore (118).

7. The valve according to claim 4, wherein said recess (111) is defined by a circumferentially extending groove (110) in an inner peripheral surface of said valve bore that extends circumferentially around at least a portion of said valve bore (118).

8. The valve according to claim 4, wherein said groove (110) extends from about 30 degrees to about 150 degrees circumferentially around said valve bore (118) and has a depth of about 0.5–10.0 mm.

9. The valve bore according to claim 8, wherein said groove (110) extends about 90 degrees circumferentially around said valve bore (118) and has a depth of about 3 mm.

10. The valve according to claim 1, wherein said gap width is from about 0.1 mm to about 3 mm.

11. The valve according to claim 10, wherein said gap width is about 0.5 mm.

* * * * *